United States Patent Office 2,919,102
Patented Dec. 29, 1959

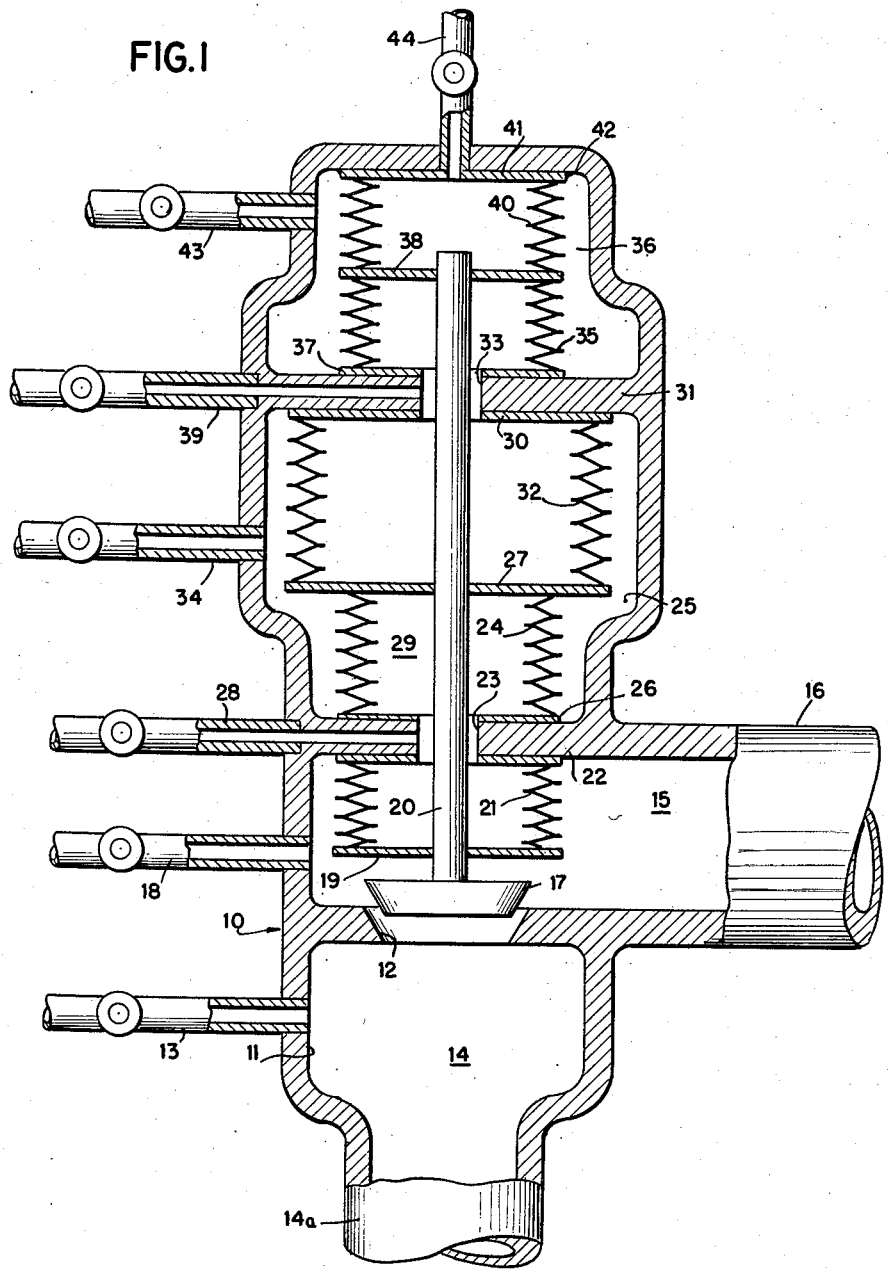

2,919,102

FLUID AMPLIFIERS

Melville F. Peters, Livingston, N.J.

Application March 1, 1954, Serial No. 413,349

3 Claims. (Cl. 251—61)

This invention relates to devices for controlling the rate of flow of large volumes of fluid acting under high pressures by expending a small amount of energy.

Where it is desired to control the rate of flow of a large volume of fluid acting under high pressures by means of a small expenditure of energy, it is possible to use a control system employing a plurality of bellows to which the small amount of energy is applied. The control fluid which is applied to the plurality of bellows comes from sources which in general are independent of the large high pressure fluid, and these control fluids may come from more than one source. In order to have the control fluids operate the valve according to some predetermined pattern, it is necessary to have all of the forces exerted by the high pressure fluid on the valve stem balanced by connecting bellows and bellows assemblies to the stem. This balancing of the valve stem can only be accomplished by controlling the pressure on both the interior and the exterior surfaces of each bellows. This difference between the pressure on the interior and the exterior surfaces called the pressure differential acting on the inner and outer surfaces of the bellows, is necessary in valve control, since the movement of the valve stem will depend upon the effective area of the bellows and the pressure differential across the inner and outer surface.

Since bellows have limitations as to the amount of pressure differential that they can withstand, it is often necessary to employ a plurality of bellows assemblies to achieve a result which might otherwise be achieved were it possible to construct a bellows capable of withstanding the greatest pressure differential encountered in service.

Accordingly, it is an object of the present invention to make a valve stem respond to small changes in pressure in the control chambers by making the force required to move the valve stem independent of the forces produced on the stem by the load pressure.

It is a further object of the present invention to make the power amplification of the control device high by making the pressure required to move the valve stem independent of all the forces produced on the valve stem by the load pressure and consequently to limit the work or power required to move the valve disc to the fluctuating or control pressure acting against the forces of restitution.

It is an object of the present invention to use the valve stem to integrate or add algebraically all of the forces produced by fluid pressure on the bellows assembly to the forces of restitution and to adjust the piston areas so that all the forces will equal zero, except the forces produced by the fluctuating pressures and these forces shall be opposed and balanced by the forces of restitution.

The invention consists of the construction, combination and arrangement of parts, as herein described, illustrated and claimed.

In the accompanying drawings, forming a part hereof is illustrated one form of embodiment of the invention and in which:

Figure 1 is a view in longitudinal section showing a complete embodiment of the present invention.

Referring to Figure 1 there is shown a fluid pressure control device suitable for operating a fluid controlling valve, consisting of a housing 10, having a valve inlet chamber 11 therein and a valve seat 12 at the top of said chamber. A conduit 13 is attached to the housing 10 and communicates with the interior of the inlet chamber. The conduit 13 is employed for control purposes as hereinafter more fully described. The inlet line 14a leads into the housing 10 and an outlet chamber 15 is formed above the inlet chamber 14. The outlet chamber has conduit 16 attached thereto and carries the valve disc 17 therein. A second control conduit 18 communicates with the interior of the outlet chamber 15 and is employed in a hereinafter more fully described manner. A shoulder member 19 is attached to the valve stem 20 above the valve disc 17. A first bellows 21 of the bellows assembly in the control device is secured between the shoulder 19 and a partition 22 in the housing 10. The partition 22 forms the upper portion of the chamber 15. The partition 22 is centrally bored as indicated at 23 to receive therethrough the valve stem 20. The bore 23 is somewhat larger than the size of the valve stem 20 so that fluid can circulate freely between the bellows 21 and a second bellows 24 which is located within a central chamber 25 of the housing 10. The bellows 24 is secured at its lower end to a pierced plate 26 which is welded to the top of partition 22. The upper end of the bellows 24 is sealed by means of a shoulder member 27 which is welded to the valve stem 20. A conduit 28 is connected to the housing 10 and traverses the partition 22 communicating with the bore 23 so that control fluid may be introduced into the chamber 29 consisting of the area within the two bellows 21, 24, which areas are sealed by the shoulders 19, 27. A third bellows 32 is disposed within the central chamber 25 and is welded at its lower end to the shoulder 27 and at its upper end to a pierced plate 30 which in turn is welded to a top partition 31 forming the top of the central chamber 25. The third bellows 32 is in communication with a bore 33 which is provided in the partition 31. A control fluid conduit 34 communicates with the central chamber 25 and is adapted to conduct controlling fluid into contact with the exterior surfaces of the bellows 24 and 32.

A fourth bellows 35 is carried within a top chamber 36 in the housing 10 and has its lowermost plate welded to a flat pierced plate-like member 37 which in turn is welded over the valve stem opening 33 of the partition 31. The upper portion of the bellows 35 is welded to a top shoulder member 38 which is welded to the valve stem 20. Fluid may circulate between the bellows 32 and 35 by way of the bore 33 in the partition 31. Another control conduit 39 is lead into the housing 10 through the partition 31 and communicates with the interior chamber formed by the bellows 32 and 35. A top control bellows 40 is welded at its lower end to the top shoulder member 38 and at its upper end to a plate 41 which in turn is welded to the top of the housing 10 as indicated at 42. A top control fluid conduit 43 is led into the top chamber 36 and is adapted to lead fluid into contact with the exterior surfaces of the bellows 35 and 40. A conduit 44 is attached to the top of the housing 10 and communicates with the interior of the top control bellows 40.

As a first step in controlling the large volume of fluid flowing through the valve of Figure 1, it is necessary to make the movement of the valve disc 17 independent of the pressure of the fluid in the inlet chamber 14 of the housing 10. Since this pressure can fluctuate over a wide range it is necessary to provide some means which will compensate for the change in pressure. This compensation is accomplished by balancing the forces acting on the bottom of the disc 17 with forces acting downwardly on the valve stem. To accomplish this balance the effective area of the top control bellows 40 is made equal to the area of the bottom of the valve disc 17 and the control conduit 13 is connected to the top conduit 44. The second step necessary for control of the fluid is to balance the forces acting on the top of the valve disc 17 at all times. This balance is achieved by making the bellows 21 with an effective area equal to the area of the top of the valve disc 17. It will be seen that all of the forces acting on the valve stem at any position of the valve are now independent of the position of the valve stem whether it be open or closed.

Conduit 18 which communicates with the chamber 15 may be interconnected to one of the other conduits, as for example, 28 to control the pressure differential across certain of the bellows in the assembly. Connecting conduit 18 to the bellows in the assembly constitutes a protective pressure for said bellows. It will be noted that the area of bellows 21 is the same as that of bellows 24. As a result, the forces acting on the valve stem 20 by the bellows 21 will be exactly equal and opposite to the forces acting upon the valve stem 20 created by the forces acting on the bellows 24.

It will be noted further that the bellows 35 and 40, in the upper chamber 36 are also of the same size. As a result, the pressure applied to the exterior of the bellows 35, 40, will have no effect in moving the valve stem 20. It will now be seen that all of the forces acting on the valve stem are balanced out with the exception of those created by the forces applied to the central chamber 25 and the interior chamber formed by the bellows 32 and 35. The pressure in the chamber 25 is controlled through conduit 34 which is sent to one of the control pressures (not shown). This fluid acts upon the exterior of bellows 32 and 24 and since they have a difference in diameter any positive pressure will cause the larger bellows 32 to raise the valve stem 20. By positive pressure is meant one which is in excess of the pressure within the bellows 32, 35.

The conduit 39 is connected to a second pressure control system and is led into the chamber consisting of the interior of bellows 32 and 35. It will be seen that except for the pressure differential between the chamber 25 and the interior of the bellows 32, 35, all of the forces acting on the bellows assemblies are balanced. Therefore, the movement of the valve stem 20 will depend upon the pressure differential acting between the chamber 25 and the chamber comprising the interior of bellows 32 and 35.

It is to be understood that each bellows has a certain spring action and in effect operates as a spring. Accordingly, the position of the valve either opened or closed, when the pressure is zero, can be determind by constructing the bellows so that spring action of the combined bellows assembly will put the valve disc 17 in the desired position at zero pressure.

The sensitivity of the valve for any pressure differential can be increased by increasing the area of the main control bellows 32 or decreased by decreasing the area of said bellows 32.

Having thus fully described the invention what is claimed as new and desired to be secured by Letters Patent of the United States is:

1. A fluid control assembly comprising a housing having an inlet port and an outlet port, a wall intermediate said ports presenting an inlet chamber and an outlet chamber and having a valve aperture therein intercommunicating said chambers, first and second partitions within said housing providing therein central and top chambers respectively, said partitions each having an opening therein aligned with said valve aperture and said central chamber being disposed between said outlet chamber and said top chamber, a valve stem within said housing extending through the openings in said first and second partitions and being of dimensions less than the area of such openings, bellows means supporting said valve stem within said housing, a valve head fixed to said valve stem at one end thereof and disposed within said outlet chamber for movement toward and away from said wall in opening and closing relation to said valve aperture, said bellows means including a first bellows within said top chamber having its opposite ends fixed respectively to that end of said valve stem remote from said valve head and an inner wall portion of said top chamber, said first bellows having its interior isolated from said top chamber and being provided with means communicating such interior to said inlet chamber with the effective area of said first bellows being equal to the area of said valve head portion facing said inlet chamber, second and third bellows fixed to opposite sides of said first partition in surrounding relation to said valve stem with the opposite ends of such bellows being fixed to the valve stem, the interiors of said second and third bellows being in communication through the opening in said first partition with said second bellows being within said outlet chamber and said third bellows being within said central chamber, means communicating the interiors of said second and third bellows with said outlet chamber, fourth and fifth bellows disposed respectively in said top and central chambers in surrounding relationship to said valve stem with the opposite ends of such bellows being fixed to the valve stem, said fourth and fifth bellows being fixed to opposite sides of said second partition and having their interiors communicating through the opening in such second partition, conduit means communicating with the interiors of said fourth and fifth bellows to apply a first control pressure thereto, and second conduit means communicating with said central chamber for applying a second control pressure thereto.

2. A fluid control assembly comprising a housing having an inlet port and an outlet port, a wall intermediate said ports presenting an inlet chamber and an outlet chamber and having a valve aperture therein communicating said chambers, a partition wall in said housing providing a chamber therein, said partition wall having an opening therein aligned with said valve aperture, a valve stem within said housing projecting through said opening in the partition wall and being of a diameter less than the diameter of such opening, a valve head fixed to one end of said valve stem within said outlet chamber and being movable with the valve stem toward and away from said valve aperture to open and close the same, bellows means fixed to said valve stem and supporting the same within said housing, said bellows means including a first bellows fixed at one end to that end of the valve stem opposite said valve head and at its other end to an inner wall portion of said housing, means communicating the interior of said first bellows with said inlet chamber, a second bellows fixed at one end to an intermediate portion of said valve stem and being disposed in surrounding relation thereto with its opposite end fixed to said housing, said second bellows being disposed within said housing on that side of said partition wall remote from said outlet chamber, means sealing the opening in said partition wall preventing communication between said outlet chamber and the chamber in the housing afforded by said partition wall, first control conduit means communicating with the interior of said second bellows for establishing a first control pressure therein, and second control conduit means communicating with the last mentioned chamber for establishing a second control pressure therein.

3. The assembly as defined in and by claim 2 wherein said means sealing the opening in the partition wall comprises a pair of bellows each having one end thereof fixed to said partition wall on opposite sides thereof and in surrounding relationship to said valve stem, said pair of bellows having their opposite ends fixed to said valve stem.

References Cited in the file of this patent

UNITED STATES PATENTS

| | | |
|---|---|---|
| 1,153,681 | Fulton | Sept. 14, 1915 |
| 2,111,855 | Groh | Mar. 22, 1938 |
| 2,302,014 | Fausek | Nov. 17, 1942 |
| 2,376,711 | Mock | May 22, 1945 |
| 2,520,468 | Moore | Aug. 29, 1950 |
| 2,569,762 | Hilgert | Oct. 2, 1951 |
| 2,573,522 | Watt | Oct. 30, 1951 |
| 2,648,345 | Markson | Aug. 11, 1953 |
| 2,659,381 | Seljos | Nov. 17, 1953 |
| 2,675,819 | Eckman et al. | Apr. 20, 1954 |